March 23, 1954     G. A. WILSON     2,672,714
GRINDING MACHINE
Filed Nov. 7, 1950     2 Sheets-Sheet 1
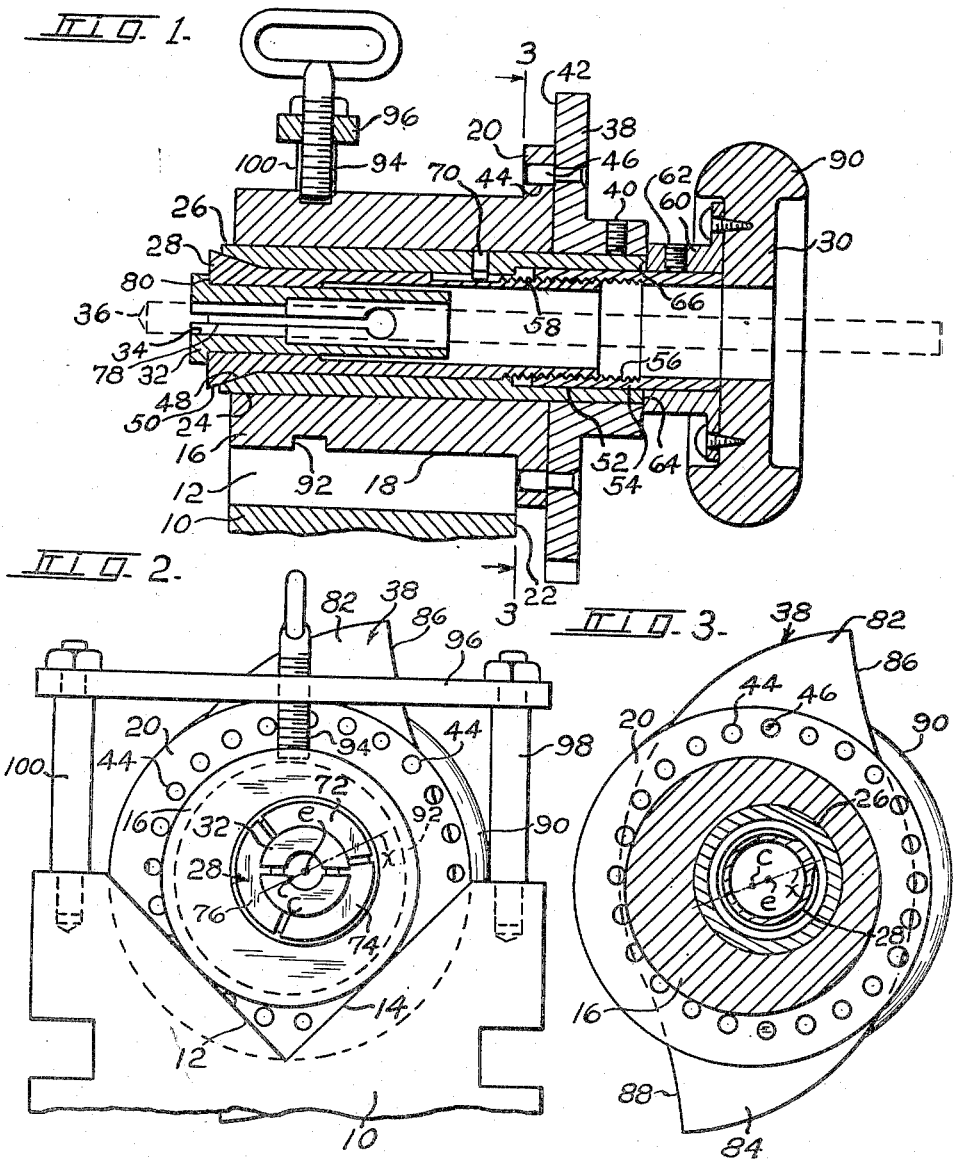
INVENTOR
GARNET A. WILSON
BY *J. P. Keiper*
ATTORNEY March 23, 1954
G. A. WILSON
2,672,714
GRINDING MACHINE
Filed Nov. 7, 1950
2 Sheets-Sheet 2
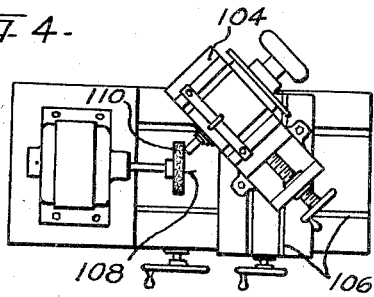
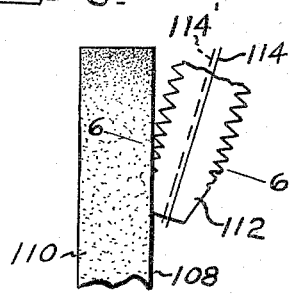
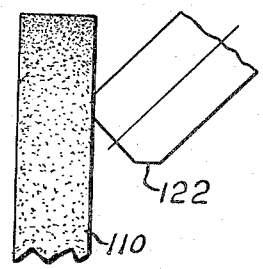
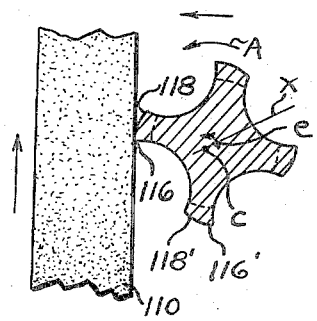
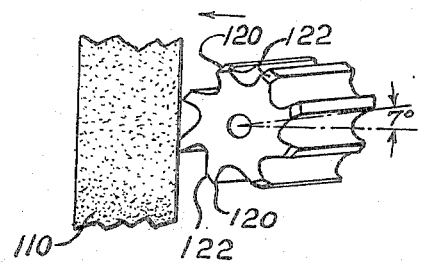
INVENTOR
GARNET A. WILSON
BY
ATTORNEY Patented Mar. 23, 1954

2,672,714

UNITED STATES PATENT OFFICE 2,672,714

GRINDING MACHINE

Garnet A. Wilson, Rochester, N. Y.

Application November 7, 1950, Serial No. 194,503

5 Claims. (Cl. 51—124)

This invention relates to grinding machines for taps, reamers, drills and the like.

While the re-sharpening or dressing of taps, reamers, drills, etc., is usually effected through skillful hand operations, it will be appreciated that the accurate and uniform dressing of the multiple cutting edges of such tools promotes true cutting. It has been the practice in the grinding of drill bits, for example, to manually grind a cutting edge at the proper angle to the axis for the material for which the drill is to be used, and to then provide clearance behind the cutting edge by grinding at an ever-increasing angle. Care must be exercised to avoid accidental grinding contact of one cutting edge while dressing and providing clearance behind the other. To assure sufficient clearance, it is usual to provide an excess of clearance beyond that necessary in hand grinding. Some small tools with multiple cutting edges, such as reamers, require exceedingly careful treatment to avoid accidental grinding of adjacent cutting surfaces.

The present invention resides in the provision of a fixture for holding a tool at a proper angle with reference to a grinding face for grinding its cutting edges, and providing suitable clearance. The fixture provides for indexing the tool so that all cutting edges will be ground alike, and where the cutting edges are not too close to one another, as in a tap or drill, the fixture includes an eccentric feature providing for the accurate grinding of clearance.

The invention contemplates holding the drill or tool being ground with its axis fixed at a selected angle to the plane of the grinding face, and the subsequent controlled movement of the drill or tool toward the face, the cutting edge being rotated away from the plane of the grinding face, while the axis is moved sidewise toward the face by the eccentric mounting. Where such rotation is not permissible, the fixture may be set at a suitable angle to grind the clearance and cutting edge, in a single planar grinding operation.

The invention is further directed to providing mechanism for indexing the tool being ground, whereby its multiple cutting faces may each be ground in exactly the same manner, whereby the cutting edges and clearance therebehind will be centered with respect to the axis of the tool. In some tools, such as reamers, wherein the adjacent cutting edges are so close as to prohibit turning of the fixture during grinding to provide clearance, the indexing feature alone is used, in which case the axis of the fixture may be slightly inclined from the horizontal, and accurate grinding of all cutting edges affected by such indexing alone.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a longitudinal sectional view of the grinding fixture;

Figure 2 is a front elevation of the fixture;

Figure 3 is a transverse section taken substantially on the line 3—3 of Figure 1;

Figure 4 is a diagrammatic plan view illustrating the mounting of the fixture of Figures 1, 2 and 3, upon a grinding machine;

Figure 5 is a diagrammatic plan view showing the grinding of a tap;

Figure 6 is an enlarged sectional view taken substantially on the line 6—6 of Figure 5;

Figure 7 is a diagrammatic plan view illustrating the grinding of a reamer; and

Figure 8 is a diagrammatic elevational view of the grinding of the reamer of Figure 7, showing the inclination of the axis thereof.

Referring to the drawings, and more particularly to Figures 1 and 2, there will be seen a V-block 10 having V-surfaces 12 and 14, the block being adapted to be mounted upon the bed of a grinding head. Mounted in the V-block is a barrel member 16 having a cylindrical surface 18 adapted to engage the faces 12 and 14 of the V-block, and an outwardly extending end flange 20 adapted to bear against the end face 22 of the V-block. The barrel member contains a bore 24 extending lengthwise therethrough and eccentrically arranged with respect to the cylindrical surface 18, as will appear from Figure 2 and also Figure 3. Within the bore 24 is a sleeve 26 adapted to receive a collet 28 and handle 30. Within the collet is a split chuck or adapter member 32, the chuck member having an internal bore 34 suitably adapted to engage a drill, tap, reamer or other tool 36 which is to be sharpened or dressed.

The sleeve 26 is provided with a flange 38 which is secured on one end thereof as by a set screw 40, the flange having a flat face 42 adapted to abut against the previously referred-to flange 20. The flange 20 is provided with a series of indexing apertures 44 arranged on a circle concentric with the bore 24 and the flange 38 is provided with one or more pins 46 projecting from the flat face 42 and adapted to engage in any selected aperture 44 or group of apertures 44. Such pins preferably make an accurate fit with the indexing apertures 44. In the form shown, the indexing ring is shown with 24 such apertures, so that the sleeve 26 may be conveniently and accurately positioned in any one of twenty-four positions, each angularly spaced from the other by equal amounts. Thus, tools with 2, 3, 4, 6, 8, or 12 cutting edges may be dressed.

The sleeve 26 is internally tapered as at 48 to receive a complementally tapered end 50 on the collet 28. The sleeve at the other end has an enlarged diameter portion 52 adapted to receive the tubular shank 54 of the handle 30. The tubular shank 54 is provided with internal threads 56 adapted to engage external threads 58 upon the inner end of the collet 28. A handle collar 60 is mounted upon the tubular handle member 54 and is secured in place by set screws or the like 62, the collar providing a shoulder 64 adapted to abut the end 66 of the sleeve 26. The collet 28 is provided with a groove into which extends a pin 70 in the sleeve 26, whereby the collet is permitted to slide axially of the sleeve 26, but rotation thereof relative to the sleeve is restrained. By reason of the interengaging threads 56 and 58 on the handle and collet, respectively, it will be seen that the collet may be drawn into the sleeve 26 so that the interengaging tapering surfaces 48 and 50 cause the collet to contract upon the split chuck member 32, thereby binding the tool 36 in position.

The collet is suitably divided into segments 72, 74 and 76, to permit the ready contracting thereof upon the chuck member 32, and the chuck member is longitudinally slitted as at 78 so that it may in turn contract upon the tool 36 to be held. The chuck member is also provided with an end shoulder 80 which is adapted to engage the end of the collet to provide a solid bearing therefor. A series of chuck or adapter members having different bores for receiving different diameter tools will be provided, as will be understood by those skilled in the art.

The flange 38 is conveniently provided with opposed ears or lobes 82 and 84 having surfaces 86 and 88, so contoured as to be conveniently engaged by the operator's thumb, while the wheel 90 of the handle 30 is grasped in the palm of the hand. Such lobes assist in indicating the indexing position of the sleeve. The barrel member 16 is provided with an annular groove 92 into which is projected the end of a thumb screw 94 threaded in a bridge member 96 supported on posts 98 and 100 from the V-block 10. The thumb screw may be drawn sufficiently tight so as to ride in the groove 92, whereby the barrel member may be rotated in the V-block 10, but yet be held in snug engagement with the V-surfaces thereof. On the other hand, the thumb screw may be tightened to hold the barrel against rotation for certain operations.

As is shown in Figure 4, the V-block is adapted to be mounted rigidly in a vise 104 mounted upon the adjustable ways 106 of a grinding machine whereby the axis of a tool held thereby may be held in a horizontal plane or an inclined plane and intersect a vertical surface 108 of the grinding wheel 110 at such angle as it is desired to grind a cutting edge. If the tool be a tap, the angle would be 15°. In the case of a drill, the angle between the axis of the drill and the plane of the grinding surface will approximate 60°, although it will be understood that this angle may vary with different drills depending upon the material to which the drill is to be adapted. In the case of a reamer, the tool may be held inclined slightly from the horizontal, and approach the wheel at an angle of 45° or 60°, as may be desired.

Referring to Figures 5 and 6, there is shown a tap 112 held by the fixture with its axis at an angle of 15° to the perpendicular face 108 of the grinding wheel 110. The axis of the tap will also preferably lie in a horizontal plane. With the tap secured in the chuck in approximately the position shown in Figure 6, and with the line of centers X extending through the barrel axis C, and the chuck center E (see Figures 2 and 3), inclined at a selected angle of about 30°, it will be seen that, upon rotation of the barrel member in the V-block, in the direction of arrow A, the tap will, by reason of the eccentricity, be caused to move laterally toward the grinding face 110, the axis of the tap roughly shifting from 114 to 114' (see Figure 5). Thus a cutting edge 116 is ground, and clearance 118 is ground therebehind as the tap is turned. It will be understood that the shoulder 20 will be against the face 22 of the V-block during this operation, and the ways 106 will be initially adjusted to the desired position for the grinding operation thus described and locked in such position.

As soon as the cutting edge 116 and clearance 118 have been ground, the sleeve 26 is slid rearwardly of the barrel 16, so that the index pins 46 are withdrawn from the apertures 44, and thereafter the sleeve manually rotated 90°, and the index pins reinserted in the corresponding apertures 44, and the sleeve moved forward in the barrel until the face 42 of flange 38 bears against flange 20. Immediately, by rotating the sleeve through the same angle as previously described, another cutting edge and clearance such as 116' and 118', respectively, are ground, the pattern so ground being identical to that previously ground to produce the cutting edge 116 and clearance 118. The sleeve is thereafter withdrawn, indexed 90° further, the operation repeated, and subsequently the sleeve is again withdrawn and indexed a further 90°. Thus, all cutting edges are dressed alike, and identical clearances are ground behind each cutting edge.

The degree of clearance ground may be varied by initially varying the angle of the line X through the centers C and E of the barrel and eccentric sleeve. If pronounced clearance is desired, such line may be set at 45°. Thus, the lateral movement of the tap axis from 114 to 114' will be increased for a set number of degrees of rotation. If a less pronounced clearance is desired, the line X may be set at 30° or even less, in which case the lateral movement of the axis 114 of the tap, as it is rotated, will be less.

No particular means need be provided for initially positioning the tap within the adapter, since the ordinary mechanic will place the tap in the adapter so as to initially correctly grind the cutting edge, and such set-up does not require a high degree of accuracy. Whether the line of centers X is arranged at 45° or 30°, or such angle as is selected, the tool will be so chucked as to properly grind the cutting edge. The clearance will then be ground by rotating the barrel so that the line of centers rotates beyond the angle selected for grinding the cutting edge. A feature of the invention lies in the exact duplication of the grinding of all cutting edges and clearances, by reason of the indexing as well as in the ability to select the degree of such clearance by selecting the angle of the line of centers X utilized to grind the cutting edge.

It will be understood that the angle "A" through which the sleeve is rotated for providing clearance, will be limited to a safe range, depending on the tool being ground, the safe range being limited by the danger of accidental contact with the grinding wheel of a cutting edge adjacent to the edge being ground.

The grinding of ordinary drills may be effected in the same manner as that applied to taps, except that the angle of the axis of the drill would be normally 60° from the face of the grinding wheel. The drill will be set in the chuck, with the cutting edge in position for grinding, with the line of eccentricity X inclined suitably, for example, 45° or 30°, or such angle as will be proper for the particular drill. Rotation of the barrel will then cause lateral movement of the drill axis by reason of the eccentricity, which in effect moves he drill toward the grinding face as it is turned to grind clearance. After grinding of one cutting edge, indexing 180° will place the other cutting edge in true position for grinding a cuting edge and clearance exactly the same as the first.

To grind a reamer where the adjacent cutting surfaces are too close to permit the safe grinding of clearance by rotation, the fixture may be mounted in the vise with the axis of the reamer suitably inclined to the horizontal by approximately 7°, as is shown in Figure 8. The angle of the axis to the wheel may be 45°, as is shown in Figure 7. When grinding by this arrangement, the thumb screw 94 is locked against the barrel to prevent rotation thereof. Thereafter, with the reamer placed in the chuck in proper position for grinding the cutting edge 120 and planar clearance 122, the ways are adjusted to bring the cutting edge into grinding contact for dressing to the extent desired. Thereafter, the sleeve may be moved axially and indexed 45°, in the case of an 8-flute ream, and the operation repeated for all cutting edges. In each case, the grinding of the cutting edge and planar clearance will be effected exactly alike.

It will be seen from the foregoing that after a simple set-up of the apparatus, the accuracy of which is of no particular importance provided sound judgment and skill are employed to assure proper grinding of the first cutting edge, all the other cutting edges may be ground exactly alike, merely by rapid manipulation and proper indexing. The result is to produce true cutting edges and clearances accurately centered, and each exactly alike.

In practice, the eccentricity of the bore 26 may be approximately 1/16". If desired, the eccentricity may be laid out with the angle of the line X lying at 45°, by measuring 1/8" laterally and 1/8" vertically, giving an eccentricity of 1.414 x 1/8".

It will be understood that the fixture is capable of grinding radial relief clearance, either right hand or left hand.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a fixture for holding bits, taps, reamers, and the like for grinding, a V-block, a barrel member having a cylindrical exterior resting in said V-block, and a shoulder flange at one end adapted to engage an end of said block, said member being adapted to be rotated while in tangential contact with both surfaces of said V-block and with the flange in engagement with one end, a cylindrical aperture extending through said barrel member having an axis parallel with the axis of the barrel member, but eccentrically disposed with respect thereto, a tool holding sleeve rotatably slidably mounted in said aperture having a flange at one end only, a longitudinally extending indexing pin carried by one of said barrel member and sleeve flanges and indexing apertures disposed on a circle concentric to the sleeve axis provided in the other flange, whereby said sleeve may be freely axially withdrawn part way from said barrel member and quickly rotated to a plurality of angular positions equally displaced from one another and returned with said sleeve flange abutting said shoulder flange.

2. In a fixture for holding bits, taps, reamers, and the like for grinding, a barrel member, means for mounting said barrel member for rotation on its longitudinal axis and for limiting axial movement, said member having a transverse shoulder at one end, a cylindrical aperture extending through said barrel member having an axis parallel with the axis of the barrel member, but eccentrically disposed with respect thereto; a tool holding sleeve rotatably and slidably mounted in said aperture and having an end flange at one end only adapted to engage said shoulder; and indexing means coacting between said barrel member shoulder and sleeve flange and disposed concentric to the sleeve axis, and shiftable upon relative axial movement between the member and sleeve, whereby said sleeve may be quickly axially withdrawn, rotated and returned to a plurality of angular positions equally displaced from one another.

3. In a fixture for holding bits, taps, reamers, and the like for grinding, a support, a barrel member rotatably supported thereby, means for limiting axial movement of said member relative to said support in one direction, a cylindrical aperture extending through said barrel member having an axis parallel with the axis of the barrel member, but eccentrically disposed with respect thereto; a tool holding sleeve rotatably and slidably mounted in said aperture; a flange on one end of said barrel member, a flange on one end only of said sleeve adapted to abut and engage against the barrel flange to limit axial movement while providing for withdrawal in one direction; and indexing means coacting between said flanges and disposed concentric to the sleeve axis, said indexing means comprising a plurality of longitudinally extending equally angularly spaced apertures in one of said flanges arranged on a circle concentric with the sleeve axis, and a longitudinally extending pin on the other flange adapted to project into in complemental relation any one of said apertures, whereby said sleeve may be quickly axially withdrawn, rotated and returned to a plurality of angular positions equally displaced from one another.

4. In a fixture for holding bits, taps, reamers, and the like for grinding, a support, a barrel member rotatably mounted in said support, and having a flange adapted to engage said support and limit axial movement relative to said support, a cylindrical aperture extending through said barrel member having an axis parallel with the axis of the barrel member, but eccentrically disposed with respect thereto; a tool holding sleeve rotatably and axially slidably mounted in said aperture and having a flange at one end only adapted to engage the barrel flange and limit axial movement relative to said barrel member in one direction while providing freedom of withdrawal in the other direction; and indexing means comprising uniformly angularly spaced indexing apertures in said barrel flange disposed on a circle concentric to the axis of the cylindrical aperture, and longitudinally extending pins carried by said sleeve flange adapted to project into two of said apertures when said flanges are in abutting relation, whereby said sleeve may be quickly axially withdrawn and rotated to a plurality of angular positions equally displaced from one another and replaced axially to the limit of movement established by engagement of said sleeve member flange and said barrel member flange.

5. In combination, a frame, a grinding wheel mounted thereon for rotation on a horizontal axis and having an end grinding face, a grinding fixture horizontally adjustably supported on said frame, said grinding fixture comprising a member mounted for rotation on a fixed axis extending generally horizontally and laterally inclined with respect to the face of said wheel, a tool holding device rotatably and axially slidably mounted in said member on an axis slightly eccentric to said fixed axis, means providing a limit to axial movement of said device in a direction respecting said member toward said grinding face, and indexing means concentric with said eccentric axis coacting between said member and device, and adapted to prevent rotation therebetween when said device is at the limit of its movement in said member toward said face, said indexing means being rendered ineffective to prevent rotation between said member and device upon axial retractive movement of said device away from the limit of its movement in said member.

GARNET A. WILSON.

References Cited in the file of this patent

UNITED STATES PATENTS

| Number | Name | Date |
|---|---|---|
| 748,651 | Reimann | Jan. 5, 1904 |
| 916,452 | Klink et al. | Mar. 30, 1909 |
| 966,731 | Brinkmann | Aug. 9, 1910 |
| 1,379,853 | Cogsdill | May 31, 1921 |
| 1,582,014 | Kendall | Apr. 20, 1926 |
| 1,698,807 | Willhauck | Jan. 15, 1929 |
| 1,931,684 | Aker | Oct. 24, 1933 |
| 1,981,174 | Hille | Nov. 20, 1934 |
| 2,124,093 | Wells | July 19, 1938 |
| 2,130,575 | Adams | Sept. 20, 1938 |
| 2,325,364 | Boening | July 27, 1943 |
| 2,401,874 | Kilbride | June 11, 1946 |
| 2,442,318 | Weisel | May 25, 1948 |
| 2,486,044 | Lusk | Oct. 25, 1949 |
| 2,578,842 | Rollason | Dec. 18, 1951 |

FOREIGN PATENTS

| Number | Country | Date |
|---|---|---|
| 26,748 | Great Britain | Dec. 3, 1907 |